July 29, 1924.
F. W. PENDERGAST
MOTOR
Filed May 18, 1923
1,503,061
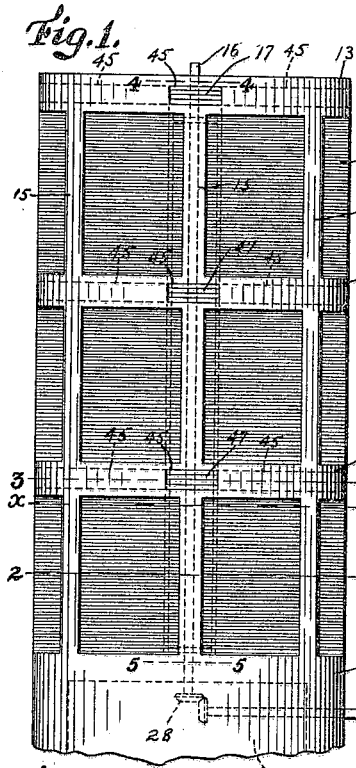
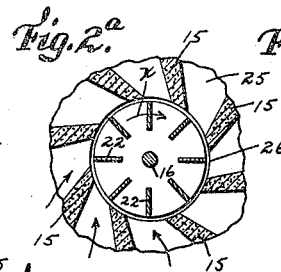
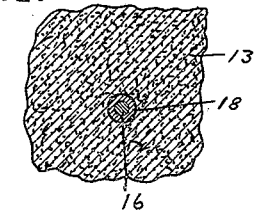
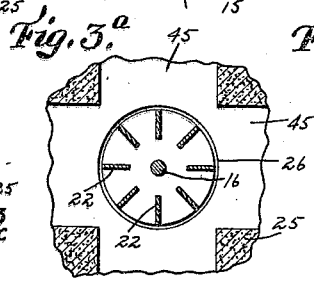
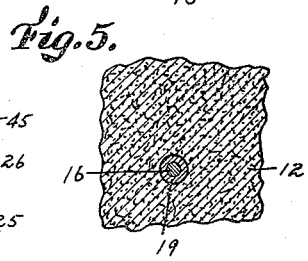
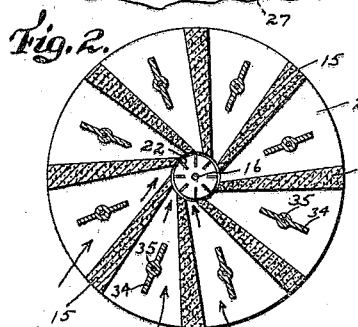
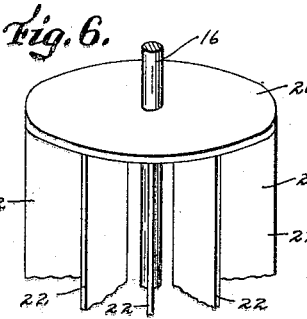
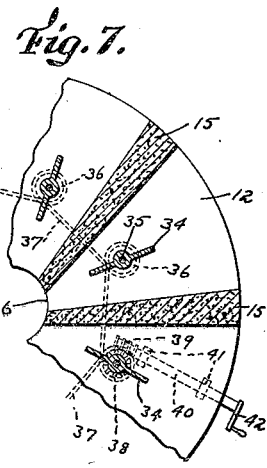
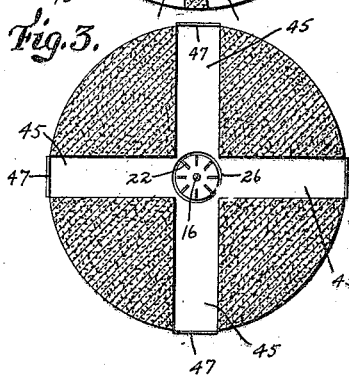
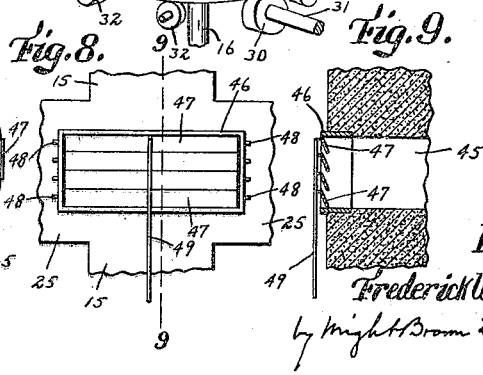
Inventor
Frederick W. Pendergast
by Wright Brown Quinby Mayy
Attys.

Patented July 29, 1924.

1,503,061

UNITED STATES PATENT OFFICE.

FREDERICK W. PENDERGAST, OF CAMBRIDGE, MASSACHUSETTS; GRACE T. PENDERGAST ADMINISTRATRIX OF SAID FREDERICK W. PENDERGAST, DECEASED.

MOTOR.

Application filed May 18, 1923. Serial No. 639,785.

*To all whom it may concern:*

Be it known that I, FREDERICK W. PENDERGAST, a citizen of the United States, residing at Cambridge, in the county of Middlesex and State of Massachusetts, have invented new and useful Improvements in Motors, of which the following is a specification.

This application is a continuation, in part, of my application for wind motors, filed November 19, 1920, Serial No. 425,097.

This invention relates chiefly to means for utilizing wind power comprising a fixed vertical structure exposed on all sides to wind, and a wind wheel rotatable on a vertical axis within the said structure by wind passing through openings in the latter and impinging on the wheel.

The object of the invention is to provide a wind motor of the character stated, a supporting structure or tower of improved form and construction, adapted to concentrate wind entering the structure at the windward side thereof, and to direct concentrated wind currents or blasts against the blades of a suitable wind wheel within the structure, and to provide improved means for regulating the admission of air to the wind wheel, and preventing back pressure of the escaping air.

The invention is embodied in the improvements which I will now proceed to describe and claim.

Of the accompanying drawings forming a part of this specification,—

Figure 1 is a side elevation of a wind motor embodying the invention.

Figure 2 is a section on line 2—2 of Figure 1.

Figure 2ª is an enlargement of a portion of Figure 2.

Figure 3 is a section on line 3—3 of Figure 1.

Figure 3ª is an enlargement of a portion of Figure 3.

Figure 4 is a fragmentary section on line 4—4 of Figure 1.

Figure 5 is a fragmentary section on line 5—5 of Figure 1.

Figure 6 is a perspective view of the wind wheel, portions thereof being broken away.

Figure 7 is an enlargement of a portion of Figure 2, showing means for adjusting the shutters or vanes shown by Figure 2.

Figure 8 is an enlargement of a portion of Figure 1.

Figure 9 is a section on line 9—9 of Figure 8.

The same reference characters indicate the same parts in all the figures.

In carrying out my invention I construct from reinforced concrete an immovable supporting structure or tower, which includes a transverse base web 12, a transverse head web 13, and longitudinal tangential webs 15, extending vertically between the base and head webs.

The tower is so located that it is exposed to wind moving in any substantially horizontal direction, the tower being preferably circular in horizontal section, although it may be of octagonal, or either polygonal or approximately circular shape. The outer edges of the webs 15 are at the perimeter of the tower, and at opposite sides of the intake ends of wind-conducting and concentrating passages extending inwardly from the exterior of the tower. The inner edges of said webs are at opposite sides of the discharge ends of said passages, and are spaced equidistant from the vertical center or axis of the tower, and are grouped about a central wheel-receiving space surrounding the tower axis.

In said receiving space is located a wind wheel having a vertical shaft 16, journaled in a bearing 18 (Figure 4), in the head web 13, and in a bearing 19 (Figure 5) in the base web 12.

The wind wheel as here shown, and particularly by Figure 6, may include an upper head 20, and a lower head 21, both attached to the shaft 16, and a plurality of blades 22, extending between the heads 20 and 21, said blades being preferably radial to the axis of the wheel.

The webs 15 converge from the perimeter of the tower inwardly, and their vertical sides are substantially tangential to the perimeter of the wind wheel, the arrangement being such that wind entering at the windward side of the tower, as indicated by the arrows in Figures 2 and 2ª, is concentrated and caused to impinge forcibly against some of the blades 22, and cause a unidirectional rotation of the wheel.

In practice the width of the webs 15, or the distance between the outer and inner vertical edges, is preferably much greater than the diameter of the wind wheel, so that the outer ends of the air-concentrating passages are relatively wide, and are adapted to receive relatively large volumes of wind. The width of the webs 15 may, for example, be ten times the diameter of the wind wheel, so that provision may be made for collecting and concentrating upon the wind wheel large volumes of wind. The direction of rotation of the wind wheel is indicated by the arrow $x$ in Figure 2ª.

The tower may be of any desired height, the wind wheel extending from the lower to the upper end of the tower. To provide adequate strength when the tower is of considerable height, I provide a horizontal web or webs 25, joined to and bracing the vertical webs 15 between the base and head portions of the tower. The horizontal web 25 is provided with a central opening 26 surrounding the wheel-receiving space.

The shaft 16 of the wind wheel may be adapted to transmit power from the wheel. As shown by dotted lines in Figure 1, the shaft 16 is extended into a chamber 27 in the base portion 12, and provided with a power-transmitting gear 28.

One of the heads of the wind wheel, preferably the lower head 21, may constitute an element of power-transmitting means cooperating with a wheel 30, on a power-transmitting shaft 31. The head 21 and wheel 30 may be in frictional engagement with each other, as shown by Figure 6, or the head and wheel may have intermeshing gear teeth positively rotating the wheel.

The weight of the wind wheel may be supported by antifriction rolls 32, journaled in fixed bearings, and in rolling contact with the under side of the head 21.

Governing shutters or vanes 34 may be located in the passages between the webs 15, to shut off or regulate the admission of wind to the wind wheel. Said shutters are fixed to, and extend in opposite radial directions from vertical shafts 35, journaled in suitable bearings in the transverse webs, the shafts extending into the chamber 27, and being provided at their lower ends with pulleys 36. The pulleys of all the shafts are connected by a cable 37, wrapped around each pulley, the arrangement being such that when one shaft 35 is turned in its bearings, the other shafts 35 are similarly turned through the cable.

One of the shafts 35 is provided with a worm gear 38, engaged by a worm 39 on a shaft 40, which is journaled in bearings 41 on the base 12. The shaft 40 may be rotated by a crank 42, or otherwise, to rotate the gear 38.

To avoid confusion I have omitted the shutters and their actuating means from Figure 1.

It will be seen that the main portion of the tower between its base and head portions is annular and surrounds the wind wheel. It will also be seen that the immovability of the tower enables the width of the walls of the wind-conducting and concentrating passages, or the distance between their outer and inner ends, to greatly exceed the diameter of the wind wheel, so that the intake ends of said passages may have any desired receiving capacity, and a much greater capacity than would be possible if the wind passages were formed in an annular structure mounted to rotate. The receiving capacity of said intake ends increases with the distance of said ends from the center of the tower. The immovability of the tower enables its diameter to be indefinitely increased without practical objections, whereas, if the tower, or any annular structure containing said passages, were mounted to rotate, its diameter or bulk and weight must be limited.

The wind entering at the windward side of the tower escapes through the outlets provided by the openings between the vertical webs 15, at the lee side, and through supplemental outlets which I provide, to prevent back pressure on the wheel. Said supplemental outlets are formed by radial passages 45, which communicate with the openings 26 in the horizontal webs, and are preferably formed in said webs and extend from said openings to the perimeter of the tower, as shown by Figures 3 and 3ª, and by full and dotted lines in Figure 1. In this instance, I show four passages 45, opening on the perimeter of the tower at uniform distances apart, although any other desired number of passages may be provided. At the outer ends of said passages I provide shutters, which may be closed at the windward side of the tower, and opened at the lee side. A considerable portion of the air passes from the wheel through the openings 26, and the passages 45 at the lee side, the shutters of these passages being open, and the shutters of the other passages closed.

Each shutter may be constructed as shown by Figures 8 and 9, in which 46 represents a frame set in the outer end of a passage 45. Shutter sections or strips 47, having trunnions 48 journaled in bearings in said frame, are adapted to be turned simultaneously to open or close the passage 45, by a rod 49, jointed to the upper edges of the sections 47, the arrangement being such that when the rod 49 is moved endwise in one direction, the shutter sections are brought together, and when the rod is moved in the opposite direction, the sections are spaced apart, so that wind can pass freely between them.

A single rod 49 may be connected with the shutters of each vertical row or series, and extend to the base portion of the tower, so that the shutters in any vertical row may be simultaneously opened or closed.

The base of the tower may be on the bed of a body of water in motion, such as a river or a body moved by tidal action, the lower portion of the wheel being immersed in, and driven by water, and the upper portion of the tower being above the surface of the water, so that the portion of the wheel in the upper portion is driven by wind.

The surface of the water may be, for example, at the level indicated by the line $x$—$x$ (Figure 1).

I claim:

1. In a wind motor, in combination, a fixed tower exposed on all sides to wind, and having a central vertical wheel-receiving space, and a plurality of tapering wind-conducting and concentrating tangential passages extending from the exterior of the tower to the space, a wind wheel located in said receiving space and rotatable on a substantially vertical axis by wind entering the tower at the windward side thereof, the said passages being formed and arranged to direct concentrated wind currents against the wind-wheel blades in directions causing a unidirectional rotation of the wheel, vertical shafts in and extending below said passages and provided within the passages with governing shutters extending in opposite radial directions from the shafts, and means for simultaneously turning said shafts and shutters, said means including pulleys fixed to the lower ends of said shafts, a cable engaged with and connecting said pulleys, a worm gear fixed to one of said shafts, and a manually rotatable worm meshing with said gear, means being provided to transmit power from the wind wheel.

2. A wind motor comprising a molded concrete tower, composed of substantially circular transverse webs and longitudinal webs integral with and connecting the transverse webs, said webs being formed and arranged to provide a central vertically elongated wheel-receiving space; and a wind wheel rotatable in said space, the longitudinal webs being tangentially arranged and forming fixed sides of tapering wind-conducting and concentrating passages, extending from the exterior of the tower to said space.

3. A wind motor substantially as specified by claim 2, the said tower being provided with supplemental wind outlets extending from the said wheel-receiving space to the perimeter of the tower, and arranged to conduct wind from said space to the lee side of the tower.

4. A wind motor substantially as specified by claim 2, the said tower being provided with supplemental wind outlets, extending from the said wheel-receiving space to the perimeter of the tower, and arranged to conduct wind from said space to the lee side of the tower, the said outlets being provided with shutters whereby the outlets at the windward side of the tower may be closed.

5. A wind motor substantially as specified by claim 2, comprising also longitudinally extending shafts journaled in bearings in said transverse webs, and provided within said passages with governing shutters that extend radially in opposite directions from the shaft, and means for turning said shafts and shutters.

6. A wind motor comprising a tower providing a central vertically elongated wheel-receiving chamber and a series of wind-conducting passages extending radially from the exterior of the tower to said chamber, said passages tapering toward the axial chamber, a wind wheel mounted in the central chamber in the tower and comprising a shaft, vertically spaced heads secured to the shaft and blades connecting said heads, anti-friction bearings on the tower supporting the wind-wheel, and a power shaft having thereon a driving wheel in engagement with the lower head of the wind wheel.

7. A wind motor comprising a tower providing a central vertically elongated wheel-receiving chamber and a series of wind-conducing passages extending radially from the exterior of the tower to said chamber, said passages tapering toward the axial chamber, a wind wheel mounted in the central chamber in the tower and comprising a shaft, vertically spaced heads secured to the shaft and blades connecting said heads, the shaft of the wind wheel extending beyond one of the heads and having a bevel pinion secured on its projecting end, and two power shafts supported by the tower and respectively provided with a pinion engaging the gear on the wheel shaft, and a friction wheel contacting with the face of one of the heads of the wind wheel.

8. A motor comprising a molded concrete tower composed of substantially circular transverse webs, and longitudinal webs integral with and connecting the transverse webs, said webs being formed and arranged to provide a central vertically elongated wheel-receiving space; and a wheel rotatable in said space, the longitudinal webs being tangentially arranged and forming fixed sides of tapering fluid-conducting passages extending from the exterior of the tower to said space.

In testimony whereof I have affixed my signature.

FREDERICK W. $\times$ PENDERGAST.
his mark

Witnesses:
  GRACE T. PENDERGAST,
  EDITH F. B. KOCH.